(12) United States Patent
Alford

(10) Patent No.: US 12,358,261 B2
(45) Date of Patent: Jul. 15, 2025

(54) SYSTEM AND METHOD OF PREVENTING THE FORMATION OF CRACKS IN A CONCRETE OR ASPHALT SURFACE

(71) Applicant: Michael A. Alford, Wendell, NC (US)

(72) Inventor: Michael A. Alford, Wendell, NC (US)

( * ) Notice: Subject to any disclaimer, the term of this patent is extended or adjusted under 35 U.S.C. 154(b) by 164 days.

(21) Appl. No.: 18/209,050

(22) Filed: Jun. 13, 2023

(65) Prior Publication Data

US 2024/0416620 A1  Dec. 19, 2024

(51) Int. Cl.
| | | |
|---|---|---|
| *B32B 13/14* | (2006.01) | |
| *B32B 5/02* | (2006.01) | |
| *B32B 7/12* | (2006.01) | |
| *B32B 37/12* | (2006.01) | |
| *B32B 37/24* | (2006.01) | |

(52) U.S. Cl.
CPC ............... *B32B 13/14* (2013.01); *B32B 5/02* (2013.01); *B32B 7/12* (2013.01); *B32B 37/12* (2013.01); *B32B 37/24* (2013.01); *B32B 2037/243* (2013.01); *B32B 2250/02* (2013.01); *B32B 2255/02* (2013.01); *B32B 2255/26* (2013.01); *B32B 2255/28* (2013.01); *B32B 2260/021* (2013.01); *B32B 2260/046* (2013.01); *B32B 2262/0276* (2013.01); *B32B 2305/18* (2013.01); *B32B 2307/4023* (2013.01); *B32B 2307/7265* (2013.01); *B32B 2307/7376* (2023.05); *B32B 2315/06* (2013.01); *B32B 2367/00* (2013.01)

(58) Field of Classification Search
CPC ............ B32B 2367/00; B32B 2315/06; B32B 2307/7265; B32B 2307/4023; B32B 2305/18; B32B 2262/0276; B32B 2260/046; B32B 2260/021; B32B 2255/28; B32B 2255/26; B32B 2255/02; B32B 2250/02; B32B 2037/243; B32B 2307/7376; B32B 37/24; B32B 37/12; B32B 5/02; B32B 13/14

See application file for complete search history.

(56) References Cited

U.S. PATENT DOCUMENTS

| | | | |
|---|---|---|---|
| 10,094,077 B1 | 10/2018 | Santoiemma | |
| 11,332,893 B2 * | 5/2022 | Pallenberg | ............ E01C 13/045 |

FOREIGN PATENT DOCUMENTS

| | | |
|---|---|---|
| CN | 111041938 A | 4/2020 |
| CN | 212956011 U | 4/2021 |
| CN | 215887815 U | 2/2022 |

OTHER PUBLICATIONS

Machine translation of CN 212956011 U (Year: 2021).*
PCT Search Report.
PCT Written Opinion.

* cited by examiner

*Primary Examiner* — Vishal I Patel
(74) *Attorney, Agent, or Firm* — Ashley D. Johnson; Dogwood Patent and Trademark Law (57) ABSTRACT

The invention is a method of preventing the formation of cracks on new recreational surfaces (e.g., tennis courts, pickleball courts, basketball courts, volleyball courts, running tracks, and the like). The method includes securing a layer of flexible fabric over the entire top surface of a concrete or asphalt base. A layer of binder is provided between the fabric layer and the base to adhere the fabric to the concrete or asphalt. One or more additional upper layers of binder are also secured over the fabric. Treating the entire area of concrete or asphalt as a single unit provides continuity of the paved base and thereby eliminates the possibility of cracks forming.

12 Claims, 6 Drawing Sheets

SYSTEM AND METHOD OF PREVENTING THE FORMATION OF CRACKS IN A CONCRETE OR ASPHALT SURFACE

FIELD OF THE INVENTION

The presently disclosed subject matter is directed to a system and method of preventing the formation of cracks in a concrete or asphalt surface. The presently disclosed subject matter further relates to specially designed athletic surfaces that are resistant to crack formation.

BACKGROUND OF THE INVENTION

All asphalt and concrete surfaces will eventually develop cracks, typically due to expansion rate differences between the pavement and underlying materials. A variety of methods exist for repairing cracks in surfaces, such as recreational courts (e.g., tennis courts, outdoor basketball courts, volleyball courts, running tracks).

The conventional process for repairing cracks in recreational courts or surfaces requires patching cracks with a filler material that solidifies to a hardened state. Prior to hardening, the crack filling material is leveled to the recreational court or surface. However, repairs made using conventional filling methods are only a temporary fix. Continued maintenance of the recreational court is necessary due to the formation of new cracks and/or the further deterioration of the existing cracks resulting from changes in temperature and moisture in the environment, ground movement, settling, and/or problems with the construction of the court or surface.

The use of slip sheets has also been developed in an effort to address cracking in recreational surfaces. In this method, a slip-sheet (i.e., a non-adhering material that isolates the crack from the surrounding environment) is adhered to the surface of the recreational court, completely covering a filled crack. An additional layer of material (typically one or more fiberglass sheets) is then placed over the non-adhering surface of the slip-sheet and is secured to the pavement or recreational court. The slip sheet then expands and contracts with the court or surface without putting stress on the crack repair. However, slip sheets can be difficult to apply, require an extensive amount of time to cure, and often result in problems caused by the recurrence of the cracks along the edges of the repair fabric. Additionally, the repair does not address the entire surface of the recreational court and is only installed in isolated areas.

Post-tensioning or pre-stressing concrete using steel cables that form a mechanical reinforcement within the concrete slab has also been used to address cracks in recreational surfaces. As a result, the amount of concrete expansion is limited, and the formation of significant cracks is prevented. However, the use of steel rods to reinforce concrete is both an expensive and time-consuming process.

It would therefore be beneficial to provide a system and method of preventing crack formation in asphalt and concrete recreational surfaces that overcomes the shortcomings of the prior art.

SUMMARY OF THE INVENTION

In some embodiments, the presently disclosed subject matter is directed to a surface comprising crack preventative characteristics. Specifically, the surface is defined by a base layer comprising an upper surface, the base layer constructed from newly formed asphalt, concrete, or combinations thereof. The surface includes a first binder layer positioned on the entire upper surface of the base layer. The binder layer can be directly adjacent to the upper surface of the base layer. The surface includes a layer of flexible fabric defined by a first side and an opposed second side, wherein the first side of the flexible fabric is in direct contact with the entire first binder layer (e.g., in direct contact with the surface area of the entire first binder layer). The surface includes a second binder layer positioned on the entire second side of the flexible fabric. The surface comprises a third binder layer positioned on the entire second binder layer.

In some embodiments, the surface further includes a color layer positioned on the entire third binder layer.

In some embodiments, the flexible fabric is polyester fabric.

In some embodiments, the flexible fabric is waterproof.

In some embodiments, the first, second, and third binder layers comprise acrylic latex.

In some embodiments, the surface is selected from a tennis court, basketball court, volleyball court, running track, or pickleball court.

In some embodiments, the newly formed asphalt or concrete was formed 1 month or less prior to creation of the surface.

In some embodiments, the fabric has a thickness of 3 inches or less.

In some embodiments, the presently disclosed subject matter is directed to a method of preventing cracking of a surface. Specifically, the method comprises creating a surface by securing a first binder to a top surface of a newly formed base layer constructed from asphalt, concrete, or combinations thereof, wherein the first binder comprises an upper surface. The method includes securing a layer of flexible fabric defined by a first side and an opposed second side to the upper surface of the first binder, wherein the first side of the flexible fabric is in direct contact with the entire upper surface of the first binder layer. The method comprises securing a second binder layer on the entire second side of the flexible fabric. The method comprises securing a third binder layer on the entire second binder layer, wherein the surface is prevented from forming cracks in the base layer.

In some embodiments, the base layer of the surface is cleaned prior to securing the first binder to the top surface of the newly formed base layer.

In some embodiments, any depressions in the base layer of the surface are patched prior to securing the first binder to the top surface of the newly formed base layer.

In some embodiments, a color system is applied on a top layer of the surface.

In some embodiments, playing lines are applied on an uppermost layer of the surface.

In some embodiments, the presently disclosed subject matter is directed to a method of forming an athletic surface with crack preventative characteristics. Specifically, the method comprises creating an athletic surface by securing a first binder to a top surface of a newly formed base layer constructed from asphalt, concrete, or combinations thereof, wherein the first binder comprises an upper surface. A layer of flexible fabric defined by a first side and an opposed second side is secured to the upper surface of the first binder, wherein the first side of the flexible fabric is in direct contact with the entire upper surface of the first binder layer. A second binder layer is secured on the entire second side of the flexible fabric. A third binder layer is secured on the entire second binder layer. The athletic surface is prevented from forming cracks in the base layer.

DETAILED DESCRIPTION OF THE INVENTION

For the purpose of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods. Thus, the term "about" is used to provide flexibility to a numerical range endpoint by providing that a given value may be "slightly above" or "slightly below" the endpoint without affecting the desired result.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

All methods described herein can be performed in any suitable order unless otherwise indicated herein or otherwise clearly contradicted by context. The use of any and all examples, or exemplary language (e.g., "such as") provided herein, is intended merely to better illuminate the invention, and does not pose a limitation on the scope of the invention unless otherwise claimed. No language in the specification should be construed as indicating any unclaimed element as essential to the practice of the invention.

Unless otherwise defined, all technical terms used herein have the same meaning as commonly understood by one of ordinary skill in the art to which this disclosure belongs.

The presently disclosed subject matter is directed to a method of preventing the formation of cracks on recreational surfaces (e.g., tennis courts, pickleball courts, basketball courts, volleyball courts, running tracks, and the like). Court surfaces suitable for use in the disclosed method can be formed from any of a variety of pavement materials including (without limitation) asphalt and concrete materials. The term "asphalt" refers to a hard and strong material comprising a bituminous binder and aggregate, generally used for paving applications. The term "concrete" refers to a hand and strong material formed by mixing a combination of hydraulic binder, sand, fine and/or course aggregates (e.g., sand and/or gravel), and water. Other pavement materials that are subject to cracking and other defects may also be strengthened by the method disclosed herein.

Figure 1:
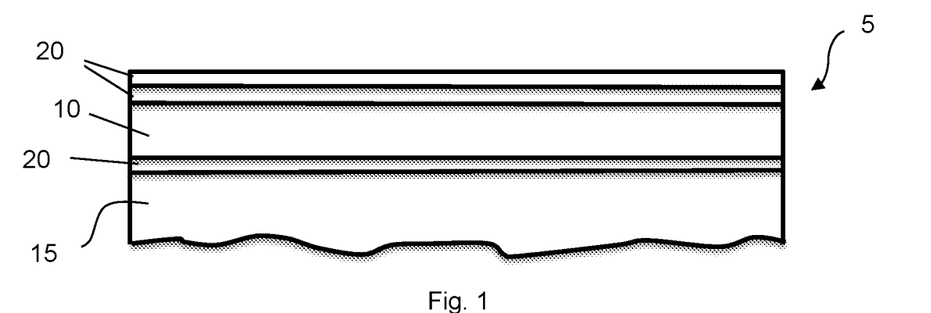
FIG. 1 is a cross-sectional view of a concrete or asphalt surface treated with a crack prevention system in accordance with some embodiments of the presently disclosed subject matter.

As illustrated in FIG. 1, system 5 includes a layer of flexible fabric 10 positioned over the entire top surface of base 15. The base can be new asphalt or concrete, such as would be found on a paved recreational court. "New" asphalt or concrete refers to the characteristic of being recently formed (e.g., after the initial curing process has been completed). A new base material is free from cracking. As noted above, cracks often form in concrete or asphalt base materials as a result of changes in environmental conditions, ground movement, settlement, and/or construction problems. The formed cracks can have different shapes, widths, and lengths and can extend a significant distance or only a small distance into the recreational court. The term "crack preventative" refers to a structure or method that prevents cracking in the concrete or asphalt base. In some embodiments, "crack preventative" results in zero cracks in the concrete or asphalt base within a 1, 5, 10, 15, or 20 year period after forming the concrete or asphalt. In some embodiments, the time period is greater than 20 years.

A layer of binder 20 is provided between the fabric layer and the support to adhere the fabric to the concrete or asphalt. One or more additional upper layers of binder 20 are also provided over fabric 10. Treating the entire area of concrete or asphalt as a single unit has been shown to provide continuity of the paved base 15 and thereby eliminates the possibility of cracks forming. The entire area refers to the entire surface area of a particular material or face of a material.

As noted above, the presently disclosed subject matter is directed to a crack-preventing recreational surface that includes flexible fabric 10 positioned over the entire top surface of base 15. The term "flexible" refers to the ability to bend easily and/or to withstand stress and tension without damage or tearing. The flexible fabric material can be any material that expands and contracts in coordination with the expansion and contraction of the recreational court. For example, flexible fabric 10 can be polyester fabric, sized and shaped to cover the entire top surface of the base. The term "polyester fabric" refers to synthetic fabric woven with threads made from polyester fibers. Chemically, polyester is a category of polymers that include the ester functional group in every repeat unit of their main chain. Most synthetic and some plant-based polyester fibers are made from ethylene, which is a constituent of petroleum that can also be derived from other sources. The polyester fabric can be a spun bonded, non-woven polyester fabric, although various types of polyester fabrics may be used.

In some embodiments, the fabric layer 10 comprises about 100 weight percent polyester fibers. In other embodiments, the fabric layer can comprise a blend of polyester fibers spun with natural fibers (e.g., 70-99 weight percent polyester fibers and 1-30 weight percent natural fibers, such as cotton).

Fabric layer 10 can have any suitable thickness, such as about 0.001-3 inches (e.g., at least/no more than about 0.001, 0.005, 0.01, 0.05, 0.1, 0.5, 1, 1.5, 2, 2.5, or 3 inches). However, the disclosed method is not limited, and the soft polyester layer can be provided in any desired thickness.

In some embodiments, flexible fabric 10 can be waterproof. The term "waterproof" refers to a material through which a fluid cannot pass in the absence of excess pressure.

As noted above, a layer of binder 20 is used to adhere fabric layer 10 to a top surface of the concrete or asphalt base. The term "binder" generally refers to any material that holds or draws other materials together to form a cohesive whole. In some embodiments, the binder can be an acrylic binder solution (e.g., Court Patch Binder 920-39, available from California Products Corporation, Louisville, Kentucky). Binder 20 can therefore include any conventional acrylic latex that provides stability to the polyester fabric and has sufficient strength to permanently attach the fabric to the base. The term "latex" as used herein means a dispersion in an aqueous carrier of polymer particles having a particle size of about 0.06-0.20 microns and a weight average molecular weight of greater than 500,000. (typically 500,000 to about 3,000,000). The term "acrylic latex" refers to homopolymers and heteropolymers of acrylate and methacrylate esters.

In some embodiments, binder 20 can comprise a mixture of an acrylic binder solution and a resurfacer. In some embodiments, the resurfacer can be an acrylic resurfacer (e.g., California Acrylic Resurfacer 920-29, available from California Products Corporation, Louisville, Kentucky).

In some embodiments, the binder can include water to provide a spreadable consistency, sufficient to saturate the fabric layer. For example, binder 20 can comprise about 1-10 weight percent water (e.g., at least/no more than about 0.1, 1, 5, or 10 weight percent), based on the total weight of the binder.

Binder 20 therefore ensures that the fabric layer remains permanently attached to the top surface of asphalt or concrete base 15. At least one additional layer of binder 20 can be added to the top surface of fabric layer 10. The upper binder layers provide protection from U.V. deterioration and/or add an additional layer of protection to the surface.

Figure 2:
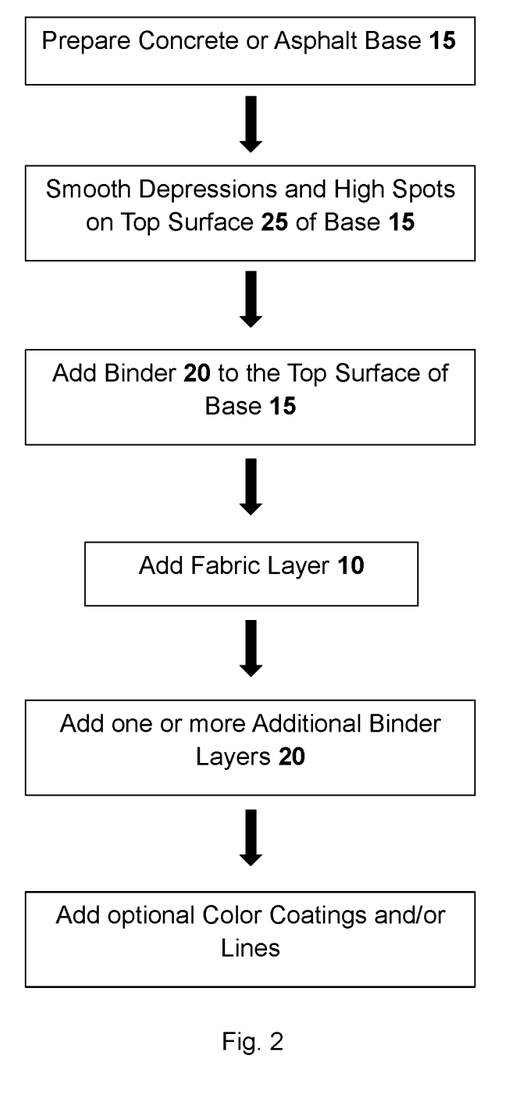
FIG. 2 is a schematic illustrating one method of applying a crack prevention system to a concrete or asphalt surface.

In use, the disclosed covering system 5 can be applied over a layer of new (e.g., just poured and cured) concrete or asphalt, as illustrated in the schematic of FIG. 2. For example, the disclosed method can be used at least/no more than about 1 day, 1 week, or 1 month after the concrete or asphalt has been prepared and allowed to harden.

If using concrete, the top surface of the concrete can be acid etched using standard techniques. For example, an acidic solution can be evenly spread onto the top concrete surface and allowed to sit for several minutes (e.g., or until no air bubbles are visible). In some embodiments, the acidic etching solution comprises 1-part muriatic acid and 10-parts water (although any suitable acidic solution can be used). The etching solution can then be rinsed from the concrete using water. A concrete primer can then be applied to the acid-etched concrete to promote adhesion of binder 20. Any suitable primer can be used, such as Ti-Coat Concrete Primer™ 63903 "A"/63904 "B" available from California Products Corporation, Louisville, Kentucky.

Any depressions along top surface 25 can be smoothed using a patch material. For example, low spots may be leveled with a filler material comprising a mixture of Portland cement, sand, and court patch binder, although other materials may also be used. In other embodiments, the patch material can be an acrylic patch material, such as California Acrylic Resurfacer™ 920-29 (available from California Products Corporation, Louisville, Kentucky). The term "depression" refers to any indentation of at least about 1/16 inch in depth. Filled spots can then be sanded smooth, e.g., with a motorized floor sander. After the fill material dries, it can be scraped, ground, sanded, or buffed flush with the surrounding top surface of base 15.

Similarly, existing high spots on the top surface of base 15 can be removed (i.e., made level with the surrounding court surface) by grinding or sanding.

The top surface of the base should be clean and free from all loose material (e.g., dirt, debris, gravel, crumbled asphalt or concrete). Any conventional method can be used to clean and scrape asphalt top surface 25, such as the use of commercial cleaning materials, brushing, hand removal, high pressure steam and/or the use of air under pressure. In one embodiment, the top surface of base 15 can be cleaned with a power-washer.

Figure 3A:
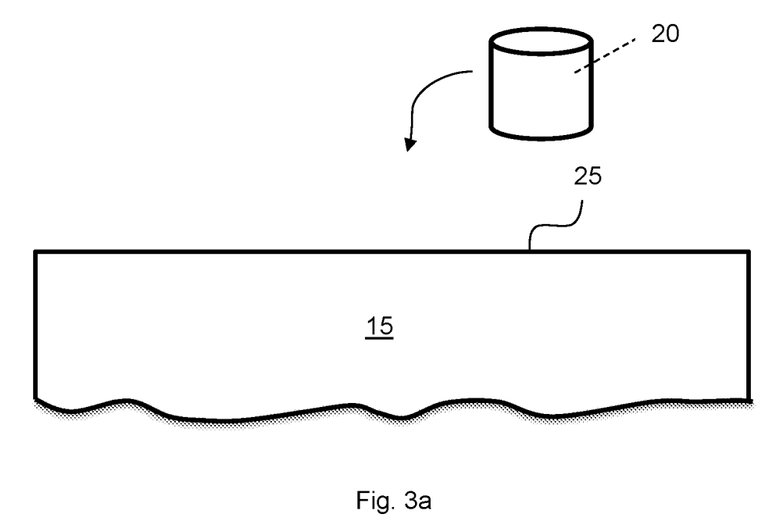
FIGS. 3a-3h are cross-sectional views of one method of forming a playing surface comprising a crack prevention feature in accordance with some embodiments of the presently disclosed subject matter.
Figure 3B:
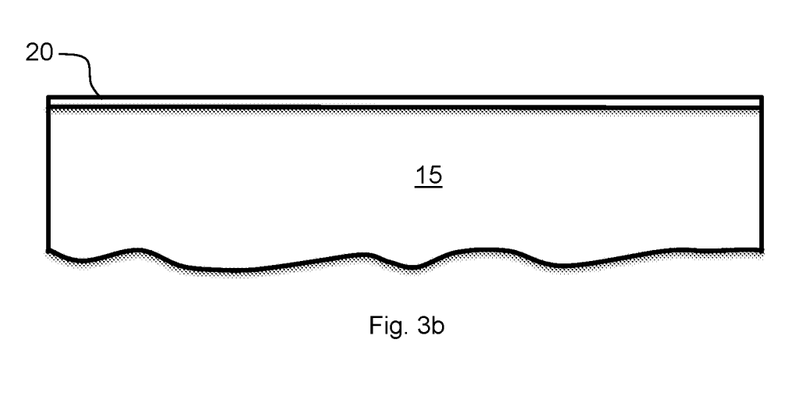
Figure 3C:
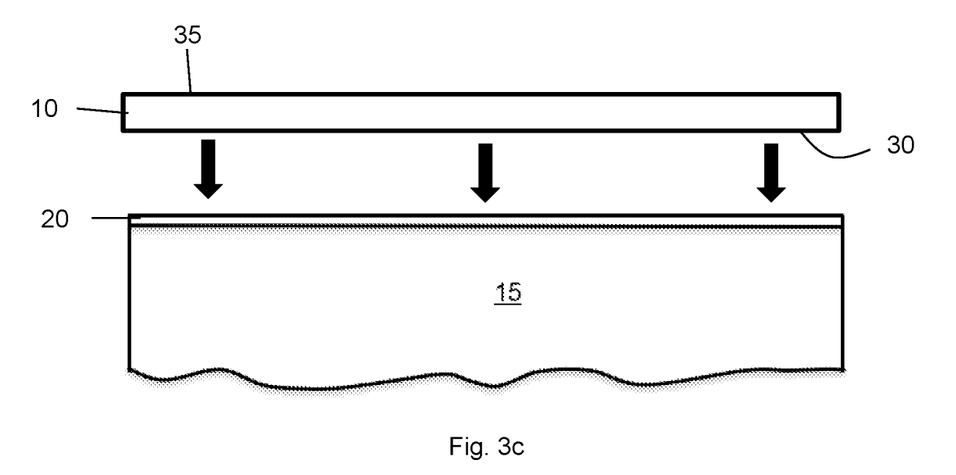
Figure 3D:
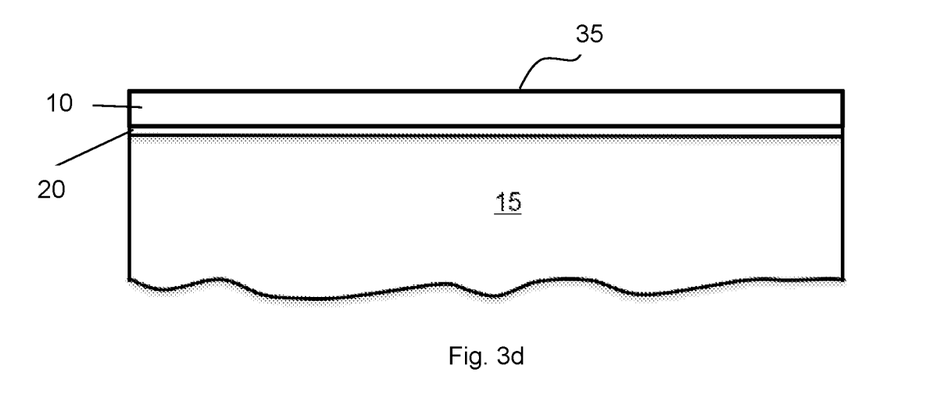

A layer of binder 20 is evenly applied over the entire top surface 25 of the base, as shown in FIGS. 3a-3b. As noted above, the binder is directly applied to the top surface of the base, allowing fabric layer 10 to adhere. As shown in FIGS. 3c and 3d, fabric 10 comprises first side 30 and opposed second side 35. The fabric first side directly contacts binder 20, thereby permanently adhering the fabric to base 15. Any method can be used to evenly apply the fabric layer over the binder, such as rolling fabric 10 onto the top surface of the binder in small (e.g., 50 foot) increments. When applying a roll of the fabric next to a previously installed roll, there may be an overlap of at least/no more than about 3 inches at the seam where the two rolls meet. The seams between the adjacent rolls of the surface can be sealed using conventional sealing procedures, such as with seam tape and/or seaming glue. Once applied over the top surface of the binder, the fabric can be smoothed, such as with a broom or other implement.

Figure 3E:
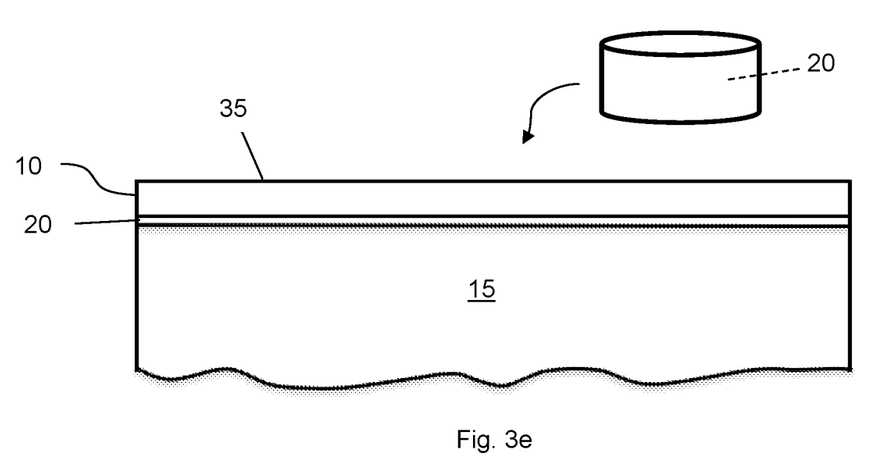
Figure 3F:
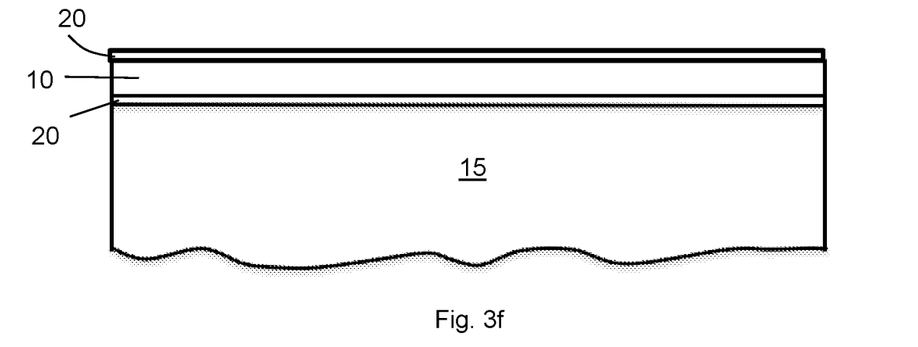
Figure 3G:
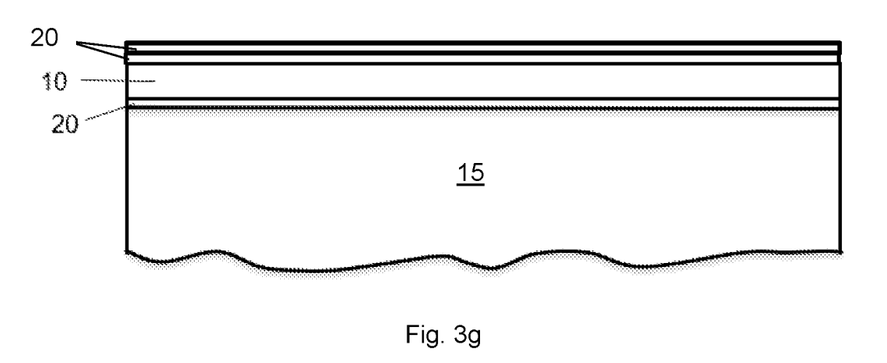

At least one additional layer of binder 20 is then directly applied to second side 35 of the fabric, as shown in FIGS. 3e-3g. The binder layer is evenly spread using any conventional method, such as the use of a flexible rubber squeegee. The various layers of binder used in the disclosed method may be the same binder or different binders.

Figure 3H:
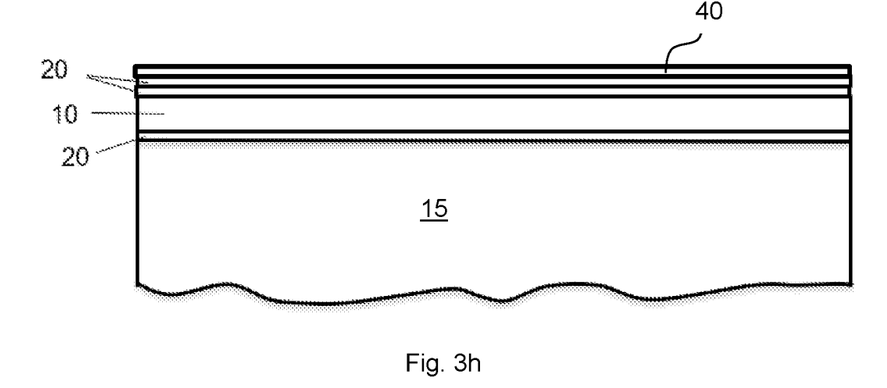

After the binder layers have dried and/or cured, color system 40 can be applied to the top surface of the binder layers to impart any desired color or combination of colors to the system, as shown in FIG. 3h. In some embodiments, the color system can be an acrylic color system, such as DecoColor MP Classic™ 920-27 and/or Hi-Hide Line Paint™ 920-22, both available from California Products Corporation, Louisville, Kentucky. The color system can include an acrylic color base and an acrylic color finish in some embodiments.

Optionally, playing lines can be applied to the top surface of the prepared surface. To complete the court resurfacing, two or more color coatings may be applied as desired, followed by, e.g., lines to properly mark the court. In one embodiment, the color coatings are flexible color coatings, which are well known in the art.

The presently disclosed subject matter provides many advantages over prior art methods. For example, installing soft fabric layer 10 over the entire surface of new asphalt or concrete provides continuity of the paved surface and eliminates the possibility of cracks forming. The system and method are therefore preventative measures to ensure that cracks do not form in a concrete or asphalt surface.

The use of a fabric layer (e.g., soft polyester) conveys superior tear strength and elongation to break characteristics, especially when compared to fiberglass materials often used in prior art systems.

Importantly, the presently disclosed subject matter includes the installation of a layer of soft fabric over the entire surface of base 15 not only to isolated areas.

The disclosed system acts as a preventative, keeping cracks from forming in a concrete or asphalt surface.

Further, the disclosed system provides a playing surface with a beautiful appearance and excellent durability without de-laminating from the paved surface.

The disclosed crack prevention system and method can be used on a wide variety of new surfaces, such as tennis courts, pickleball courts, basketball courts, volleyball courts, or running tracks.

The disclosed system can be easily applied to new concrete or asphalt without extensive training.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method of preventing cracking of a surface, the method comprising:
   creating a surface by:
   securing a first binder layer to a top surface of a newly formed base layer constructed from asphalt, concrete, or combinations thereof, wherein the first binder layer comprises an upper surface;
   securing a layer of flexible fabric defined by a first side and an opposed second side to the upper surface of the first binder layer, wherein the first side of the flexible fabric is in direct contact with the entire upper surface of the first binder layer;
   securing a second binder layer on the entire second side of the flexible fabric;
   securing a third binder layer on the entire second binder layer;
   wherein the surface is prevented from forming cracks in the base layer.

2. The method of claim 1, wherein flexible fabric is polyester fabric.

3. The method of claim 1, wherein the base layer of the surface is cleaned prior to securing the first binder to the top surface of the newly formed base layer.

4. The method of claim 1, wherein any depressions in the base layer of the surface are patched prior to securing the first binder to the top surface of the newly formed base layer.

5. The method of claim 1, further comprising applying a color system on a top layer of the surface.

6. The method of claim 1, further comprising applying playing lines on an uppermost layer of the surface.

7. The method of claim 1, wherein the surface is selected from a tennis court, basketball court, volleyball court, running track, or pickleball court.

8. The method of claim 1, wherein the newly formed asphalt or concrete was formed 1 month or less prior to creation of the surface.

9. The method of claim 1, wherein the fabric has a thickness of 3 inches or less.

10. A method of forming an athletic surface with crack preventative characteristics, the method comprising:
    creating an athletic surface by:
    securing a first binder layer to a top surface of a newly formed base layer constructed from asphalt, concrete, or combinations thereof, wherein the first binder layer comprises an upper surface;
    securing a layer of flexible fabric defined by a first side and an opposed second side to the upper surface of the first binder layer, wherein the first side of the flexible fabric is in direct contact with the entire upper surface of the first binder layer;
    securing a second binder layer on the entire second side of the flexible fabric;
    securing a third binder layer on the entire second binder layer;
    wherein the athletic surface is prevented from forming cracks in the base layer.

11. The method of claim 10, wherein the surface is selected from a tennis court, basketball court, volleyball court, running track, or pickleball court.

12. The method of claim 10, wherein the newly formed asphalt or concrete was formed 1 month or less prior to creation of the surface.

* * * * *